Aug. 30, 1966          G. KIPER                3,269,293
              BETWEEN-THE-LENS SHUTTER ASSEMBLIES
Filed Aug. 12, 1964                         4 Sheets-Sheet 1

INVENTOR.
GERD KIPER
BY

Aug. 30, 1966     G. KIPER     3,269,293
BETWEEN-THE-LENS SHUTTER ASSEMBLIES
Filed Aug. 12, 1964     4 Sheets-Sheet 2
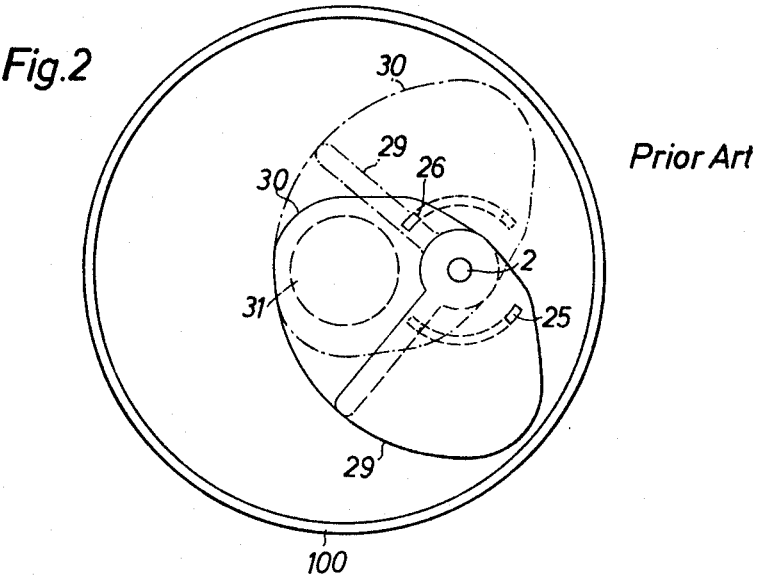
*Fig.2*     *Prior Art*
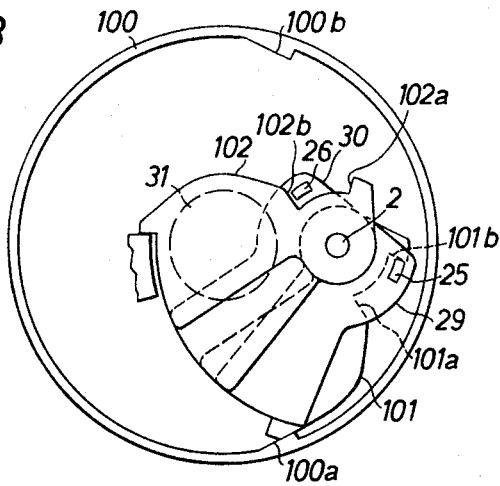
*Fig.3*
INVENTOR.
GERD KIPER
BY
Michael S. Striker
Attorney

INVENTOR.
GERD KIPER

United States Patent Office 3,269,293
Patented August 30, 1966

3,269,293
BETWEEN-THE-LENS SHUTTER ASSEMBLIES
Gerd Kiper, Unterhaching, near Munich, Germany, assignor to Agfa Aktiengesellschaft, Leverkusen, Germany
Filed Aug. 12, 1964, Ser. No. 389,112
Claims priority, application Germany, Aug. 24, 1963, A 43,890
14 Claims. (Cl. 95—60)

The present invention relates to photographic devices and in particular to shutters for photographic devices.

The present invention deals especially with those types of shutters which are composed of a pair of shutter blades which turn together from their run-down to their cocked position but which are constituted by leading and trailing blades where the leading blade turns in advance of the trailing blade from the cocked to the run-down position to uncover the exposure aperture and thus make an exposure, and where the trailing blade then follows the leading blade to the run-down position so as to cover the aperture and complete the exposure by terminating the uncovering of the exposure aperture.

Shutters of this general type are very well known in the art and may be encountered in the most widely varying constructions. However, all of the known shutters of this general type require relatively large shutter housings. In other words the blades, even though there are only two, must both swing past the exposure aperture of the shutter, with the leading shutter blade serving primarily to cover the exposure aperture when both blades are in their cocked positions and with the trailing blade serving primarily to cover the exposure aperture when both blades are in their run-down positions, so that the conventional shutter assemblies of this type require a considerable amount of space to permit the shutter blades to swing through the distance required to provide proper uncovering of the aperture during movement of the blades from their cocked to their run-down positions while maintaining the aperture covered during the turning of the blades together, without any movement therebetween, from their run-down to their cocked positions.

It is accordingly a primary object of the present invention to provide a shutter assembly of the above general type which, however, enables the outer dimensions of the shutter housing to be very substantially reduced as compared to the outer dimensions of shutter housings of conventional shutter assemblies of the above type.

Furthermore, it is an object of the invention to provide a shutter assembly which can accomplish the above object while using purely conventional structure for driving the shutter blades.

In addition, it is an object of the present invention to provide a shutter assembly of the above general type which uses shutter blades of exceedingly simple configuration so that they can be inexpensively manufactured.

Also, it is an object of the present invention to provide for a shutter assembly of the above type an arrangement where more than one shutter blade of the same construction is provided, so that the cost which would be involved in providing all of the shutter blades with different constructions are reduced.

In addition, it is an object of the invention to provide a structure of the above type which is quite rugged and very reliable in operation.

With the above objects in view, the invention includes, in a between-the-lens shutter assembly, a support means and leading and trailing shutter blades supported by the support means for turning movement between run-down and cocked positions. The leading blade turns in advance of the trailing blade from the cocked to the run-down position so as to uncover the exposure aperture and thereafter the trailing blade turns from its cocked to its run-down position to cover the aperture and thus terminate the exposure. In accordance with the present invention there is at least one auxiliary blade supported for turning movement by the support means, and a motion-transmitting means is operatively connected to this auxiliary blade and one of the leading and trailing blades to turn the auxiliary blade in response to turning of this one blade. With the structure of the invention the leading blade will at least partially cover the aperture when the blades are in their cocked positions and the trailing blade will at least partially cover the exposure aperture when the blades are in their run-down positions, and the motion-transmitting means turns the auxiliary blade in response to turning of this one blade to a position where, when the one blade partially covers the exposure aperture the auxiliary blade partially overlaps the one blade and completes the covering of the exposure aperture, while when the one blade is in the position completely displaced beyond the exposure aperture the auxiliary blade is also completely displaced beyond the exposure aperture. The action of the motion-transmitting means is such that the auxiliary blade and the said one of the leading and trailing blades overlap each other to different extents when the blades are in their cocked and run-down positions, respectively.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly diagrammatic illustration of a conventional shutter driving assembly capable of being used with the blade arrangement of the invention;

FIG. 2 schematically illustrates the positions of the blades of FIG. 1 on a scale smaller than that of FIG. 1;

FIG. 3 shows a blade arrangement of the invention in the cocked position thereof, and the scale of the blade structure and exposure aperture of FIG. 3 are identical with that of FIG. 2, so that FIG. 3 illustrates the extent to which it is possible to reduce the outer dimensions of the shutter housing by a comparison with FIG. 2;

Figure 4:
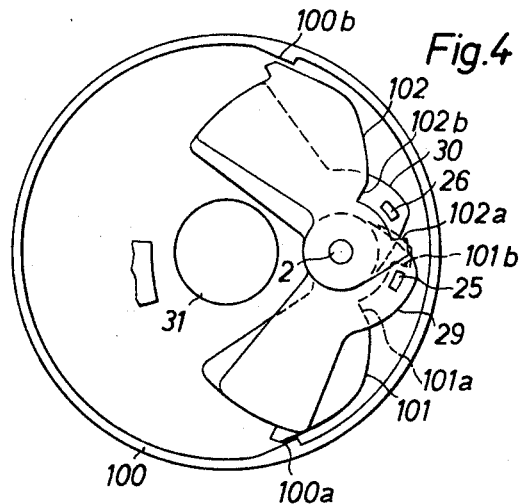
FIG. 4 illustrates the position which the parts of FIG. 3 take during exposure when the aperture is uncovered.
Figure 5:
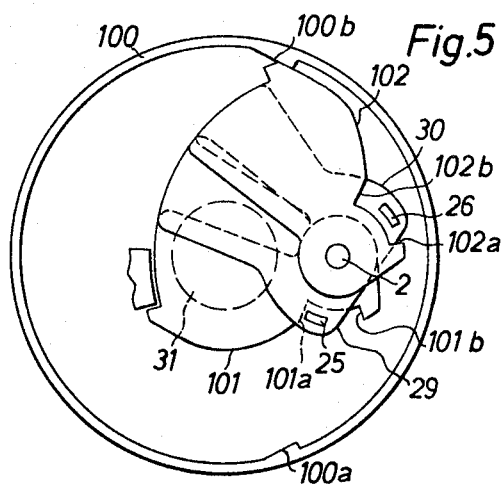
FIG. 5 illustrates the run-down position of the structure of FIGS. 3 and 4.
Figure 6:
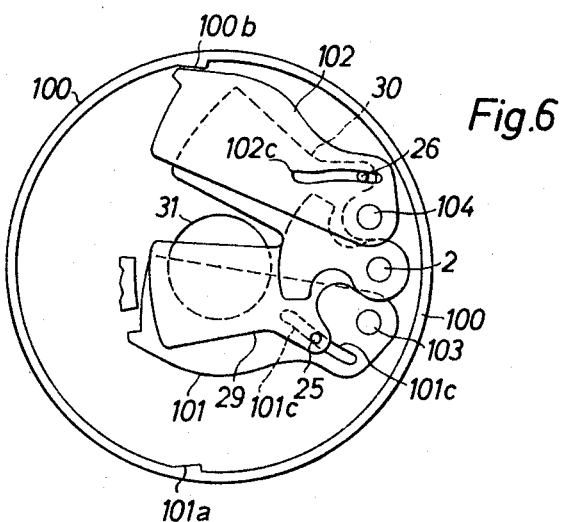
Figure 7:
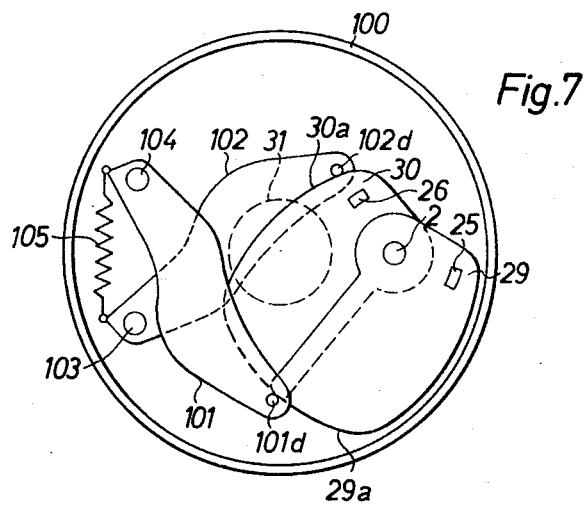

FIG. 6 is an illustration of another possible embodiment of a structure according to the invention; and FIG. 7 illustrates a further embodiment of a structure according to the present invention, the scale of the parts illustrated in FIGS. 6 and 7 being identical with the scale of the parts of FIGS. 2–5 so that FIGS. 6 and 7 by a comparison with FIG. 2 will also indicate the extent to which it is possible to reduce the outer dimensions of the shutter assembly with the structure of the invention.

Figure 1:
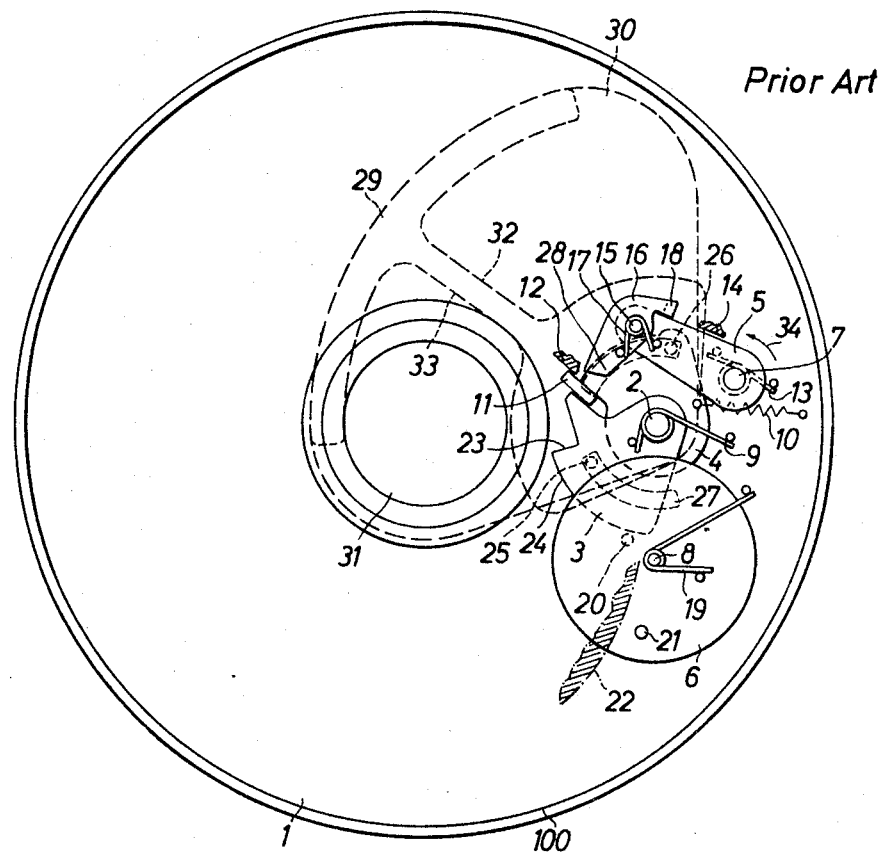

Referring now to FIG. 1, there is illustrated therein a known shutter driving structure which is only illustrated by way of example as being one possible structure which may be used for driving the shutter assembly of the invention. It is possible also to use shutter drives different from that of FIG. 1 with the structure of the invention.

Referring to FIG. 1, the shutter assembly illustrated therein includes a support means part of which is constituted by the transverse wall 1 situated in the interior of the shutter housing 100 and extending across the interior of the shutter housing in a plane normal to the optical axis. The support means includes, in addition to the transverse wall 1, a pivot pin 2 which is fixedly carried by the wall 1 and which extends parallel to the optical axis. A pair of blade-driving levers 3 and 4 are turnably supported by the pivot 2 which passes through aligned openings of the levers 3 and 4. A shutter-cocking lever 5 is supported for turning movement by a pivot pin 7 which is fixedly carried by the wall 1, and the cocking lever 5 can be manually turned by the operator in a direction of the arrow 34 through any suitable structure which extends from the lever 5 and is accessible to the operator at the exterior of the shutter assembly. The structure which determines the exposure time includes a rotary retarding mass 6 which is supported for rotary movement by a pivot pin 8 which is fixed to and extends from the wall 1 in a direction parallel to the optical axis.

A spring 9 is coiled about the shaft 2 and bears at its ends against a stationary pin fixed to the wall 1 and a pin fixed to the lever 3 so that this spring 9 urges the lever 3 in a clockwise direction, as viewed in FIG. 1, and a spring 10 is fixed at one end to the lever 4 and at its opposite end to a stationary element carried by the wall 1, so that the lever 4 is also urged by the spring 10 in a clockwise direction, as viewed in FIG. 1. The lever 4 fixedly carries a lug 11 which engages a stationary stop member 12, carried by the wall 1, so as to determine the position to which the lever 4 is turned by the spring 10, and a free edge portion of the lever 3 engages the lug 11 so that in this way the rest position of the lever 3 is determined. A spring 13 is coiled about the pin 7 and has its free ends engaging a pin carried by the plate 1 and a pin carried by the lever 5 so that the spring 13 urges the lever 5 in a clockwise direction into engagement with a stop member 14 fixedly carried by the wall 1, so that in this way the rest position of the cocking lever 5 is determined.

This cocking lever 5 fixedly carries a pivot pin 15 on which a swing-lever 16 is mounted for free turning movement relative to the lever 5, and a wire spring 17 is coiled about the pin 15 and has its free ends in engagement with a pair of pins which are respectively fixedly carried by the levers 5 and 16, so that the spring 17 urges the lever 16 to turn in a clockwise direction, as viewed in the drawing, relative to the cocking lever 5, but the swing-lever 16 has a lug 18 which engages the upper edge of the lever 5, as viewed in FIG. 1, so as to limit the clockwise turning of the lever 16 by the spring 17, as viewed in FIG. 1.

As was indicated above, the exposure-time determining structure includes the rotary mass 6. A spring 19 is coiled about the pivot pin 8 and has its free ends engaging a pin fixed to the wall 1 and a pin fixedly carried by the mass 6, so that the spring 19 urges the mass 6 to rotate in a clockwise direction, and the rotary retarding mass 6 fixedly carries a pin 20 which engages the arcuate peripheral edge 24 of the lever 3. This edge 24 extends along a circle whose center is in the axis of the pivot 2. The lever 3 in addition has a retarding edge 23 which extends from the left end of the edge 24, as viewed in FIG. 1, in a direction generally toward the axis of the pin 2, and the pin 20 will cooperate with the edge 23 to determine the exposure time in a manner well known in the art. In order to adjust the exposure time there is available to the operator an exposure-time selecting structure 22 which has an edge which is adapted to be engaged by a pin 21 which is fixed to the rotary mass 6, and depending upon the selected position of the cam 22 when the edge 23 of the lever 3 reaches the pin 20 the spring 19 will turn the mass 6 until the pin 21 engages the cam 22, and thus the extent to which the pin 20 must be displaced along the edge 23 before reaching the edge 24 will be determined so as to determine the exposure time in a manner well known in the art.

As is apparent from FIG. 1, the wall 1 is formed with the exposure aperture 31 of the shutter assembly, and when this aperture is uncovered film in the camera will be exposed, as is well known. The shutter includes a pair of shutter blades 29 and 30 which are located behind the wall 1, as viewed in FIG. 1, and these blades are also supported for turning movement by the pivot pin 2. The wall 1 is formed with a pair of slots 27 and 28 which extend along a common circle whose center is in the axis of the pin 2, and the driving lever 3 is fixed to a pin 25 which extends through the slot 27 and is fixed to the blade 29 while the driving lever 4 is fixed to a pin 26 which extends through the slot 28 and is fixed to the shutter blade 30, so that in this way the driving levers 3 and 4 are operatively connected with the shutter blades 29 and 30 for turning the latter.

When it is desired with the above-described structure to make an exposure, the operator will manually turn the cocking lever 5 in the direction of the arrow 34, and as a result the free end of the swing-lever 16 will engage the lug 11 and displace the latter away from the stop 12 so that the driving levers 3 and 4 will both turn as a unit in the direction of the arrow 34, and of course the blades 29 and 30 will also turn as a unit in a counterclockwise direction, as viewed in FIG. 1, at this time, so that the edge 32 of the blade 29 will maintain its overlapping relationship with respect to the edge 33 of the blade 30, and thus during the turning of the blades from their illustrated run-down positions to their cocked positions there will be no relative movement between the blades and thus the exposure aperture 31 will remain covered.

Because the turning axis of the cocking lever 5 is displaced from the common turning axis of the driving levers 3 and 4, the tip of the swing-lever 16 which while it engages the lug 11 tends to turn in a clockwise direction relative to the lever 5, as viewed in FIG. 1, slides along the lug 11 toward the right edge thereof, as viewed in FIG. 1, and as soon as the tip of the swing-lever 16 reaches this right edge of the lug 11, the tip of the lever 16 will ride off the lug 11 which can now swing back to its starting position under the influence of the spring 10. Thus, the blades 29 and 30 are in their cocked position at the instant when the tip of the lever 16 reaches the right edge of the lug 11 and releases the latter with the drive lever 4 for return movement to their starting position. Just before the blades reach their cocked positions the edge 23 of the lever 3 has turned slightly beyond the pin 20 so that the spring 19 has turned the mass 6 until the pin 21 engages the cam 22, and thus at this time, which is to say in the cocked position of the blades 29 and 30, the pin 20 is in engagement with the retarding edge 23 of the lever 3 and is displaced from the intersection between the edges 23 and 24 by a distance which is determined by the position of the cam 22. Therefore, at the instant when the lever 4 is released for return to its starting position, the lever 3 will be retained in its cocked position by engagement of the pin 20 with the edge 23. Thus, the lever 4 together with the leading blade 30 will immediately return to their run-down position, while the trailing blade 29 together with the lever 3 will remain in the cocked position, and thus the aperture 31 will be uncovered so that a film will be exposed. The spring 9 acts on the lever 3 to return it toward the position shown in FIG. 1, and the turning of the lever 3 at this time is retarded by the time required for the edge 23 to become displaced with respect to the pin 20 until the latter reaches the intersection of the edges 23 and 24 of the lever 3, the rotary mass 6 being turned back toward the position shown in FIG. 1 at this time in opposition to the spring 19, and as soon as the intersection of the edges 23 and 24 reaches the pin 20 the spring 9 quickly returns the lever 3 to the position shown in FIG. 1, the edge 24 at this time freely riding along the pin 20, and thus the trailing blade 29 will be returned to its run-down position so as to cover the aperture 31 and thus terminate the exposure. When the operator releases the cocking lever 5, the lever 16 will engage the right edge of the lug 11 and the spring 17 will yield until the tip of the lever 16 turns in a clockwise direction, as viewed in FIG. 1, beyond the lug whereupon the spring 17 will return the swing-lever 16 to the position where its lug 18 engages the cocking lever 5, and of course the spring 13 will return the cocking lever 5 into engagement with the stop 14.

FIG. 2 schematically illustrates the blades 29 and 30 of FIG. 1 in solid lines in their cocked position and in dot-dash lines in their run-down position, FIG. 2 also illustrating the shutter housing 100 and the exposure aperture 31, and it will be seen that the scale of FIG. 2 is reduced as compared to that of FIG. 1. According to the invention, which is illustrated in FIGS. 3–7, the shutter blade structure enables the outer dimensions of the shutter housing to be very substantially reduced. In order to illustrate the extent of reduction of the dimensions of the shutter housing capable of being achieved with the invention, FIGS. 3–7 are illustrated to the same scale as FIG. 2, and it will be noted that in FIGS. 3–7 the same exposure aperture 31 is illustrated, and the blades of the shutter assembly of the invention are shown to the same scale as the blade 29 and 30. In all of FIGS. 3–7 like parts are designated by the same reference characters.

According to the embodiment of the invention which is illustrated in FIGS. 3–5, a reduction in the size of the shutter housing 100 is brought about by adding to the shutter blades 29 and 30 auxiliary blades 101 and 102 which are also supported by the pivot pin 2 for turning movement, so that all four of the blades of FIGS. 3–5 have a common turning axis. The shutter blades 29 and 30 have with respect to the auxiliary blades 101 and 102 different positions in the run-down and cocked conditions of the shutter, and during operation of the shutter, which is to say movement of the blades between the run-down and cocked conditions, the extent of overlap between the blades changes substantially.

The structure is indicated in FIG. 3 in the cocked position. It is to be noted that in this position the trailing auxiliary blade 100 and the trailing shutter blade 29 are both displaced beyond the aperture 31 while the leading shutter blade 30 and the leading auxiliary blade 102 cooperate to cover the aperture 31. As is apparent from FIG. 3, the leading shutter blade 30 only partially covers the aperture 31 in the cocked position of the blade 30, while the auxiliary blade 102 overlaps the blade 30 and extends beyond the latter to complete the covering of the aperture 31 in the position of the parts shown in FIG. 3.

A motion-transmitting means is provided for turning the leading auxiliary blade 102 in response to turning of the leading shutter blade 30, and a second motion-transmitting means is provided for turning the trailing auxiliary blade 101 in response to turning of the trailing shutter blade 29. These motion-transmitting means include the pins 25 and 26 which are respectively fixed to the blades 29 and 30, and edge portions 101a, 101b of the blade 101 which cooperate with the pin 25 to form one of the transmission means, while the edge portions 102a and 102b of the blade 102 cooperate with the pin 26 to form the other motion-transmitting means.

When the shutter is released for movement from the cocked position of FIG. 3 back to the run-down position, the blade 29 will be retained in its cocked position by the retarding structure, as described above, so that only the blade 30 will initially return to the run-down position. During the initial turning of the blade 30, this blade will turn by itself, and it will be seen from FIG. 3 that at this time the pin 26 will approach the edge 102a of the blade 102. When the pin 26 engages the edge 102a the turning of the blade 30 will be transmitted to the blade 102, and from this moment on both of these blades will turn together to the run-down position, and FIG. 4 shows the blades 30 and 102 in their run-down position while the trailing blades 29 and 101 are still in their cocked position, so that the position which the parts take during actual exposure, when the aperture 31 is uncovered, is illustrated in FIG. 4. Thus, when the shutter is tripped to initiate the exposure first the leading shutter blade 30 and then the leading auxiliary blade 102 will turn in a clockwise direction, as viewed in FIG. 3, from the position of FIG. 3 into the position of FIG. 4. It is to be noted that when the leading blades 30 and 102 are in their run-down positions, they are both displaced beyond the aperture 31. Furthermore, it is to be noted that due to the initial turning of the blade 30 relative to the blade 102, the extent to which the leading blades overlap increases, and thus in the position of FIG. 3 where the leading blade 30 only partially covers the aperture 31 the extent of overlap of the leading blades 30 and 102 is less than the extent to which these blades overlap in the run-down position where both of these blades are situated completely beyond the aperture 31.

After the lever 3 has been released by the retarding structure, as described above in connection with FIG. 1, the blade 29 will turn toward its run-down position, and initially the auxiliary trailing blade 101 will remain stationary while the pin 25 approaches the edge 101a of the blade 100, the pin 25 extending through and beyond the blade 29 to an extent sufficient to situate the pin 25 in the plane occupied by the blade 100 so that the edges 101a and 101b will be situated in the path of movement of the pin 25 in the same way that the edges 102a and 102b are situated in the path of movement of the pin 26. When the blade 29 has turned through an angle sufficient to place the pin 25 in engagement with the edge 101a, this motion-transmitting structure will transmit turning of the blade 29 to the auxiliary trailing blade 100, and now both of the trailing blades will turn together to the rundown position shown in FIG. 5, and it will be noted that in this position the trailing shutter blade 29 only partially covers the aperture 31 while the trailing auxiliary blade 101 partly overlaps the blade 29 and extends therefrom over the aperture 31 to complete the covering thereof. Thus, while in the run-down position the blade 29 partially covers the aperture 31 and the blade 101 completes the covering of this aperture, in the cocked position both of the trailing blades are situated completely beyond the aperture 31, as is apparent from FIGS. 3 and 4, and in the cocked position it is the leading blade 30 which partially covers the aperture 31, the covering of the latter at this time being completed by the leading auxiliary blade 102.

It is to be noted that with respect to the trailing blades, these blades overlap each other in the position of FIG. 5, where they cooperate to cover the aperture 31, to an extent less than in the position of FIG. 4 where both of the trailing blades are situated beyond the aperture 31. Also, it is to be noted that in the position of FIG. 5 the blades 29 and 30 overlap each other to a slight extent, and thus when the shutter is cocked so that the blades 29 and 30 turn together with respect to the auxiliary blades 101 and 102, until the pins 25 and 26 respectively engage the edges 101b and 102b, there will be no possibility of uncovering of the aperture 31, and of course once the pins 25 and 26 engage the edges 101b and 102b, respectively during the cocking of the shutter, all of the blades turn as a unit to the position shown in FIG. 3.

The shutter housing 100 is provided with interior projections 100a and 100b, and the projection 100a limits the turning of the blades when the shutter is cocked while the projection 100b limits the turning of the blades during running-down of the leading shutter blades. Moreover, while the edges 101a, 101b, 102a, 102b of the motion-transmitting means are shown as simple abutment edges engaged by the pins 25 and 26 of the motion-transmitting means so that the auxiliary blades will turn in response to turning of the shutter blades, respectively, it is possible to give these edges 101a, 101b, 102a, 102b of the motion-transmitting means a different configuration so that they will function as camming edges which become automatically displaced with respect to the motion-transmitting pins during turning of the blades so that the extent of overlap between the pair of leading blades or between the pair of trailing blades can be altered during turning of both of the leading blades as well as during turning of both of the trailing blades.

A comparison of FIGS. 3–5, on the one hand, with FIG. 2, on the other hand, will show that with the blade structure of the invention it is possible to reduce the diameter of the shutter housing by approximately 20%, so that the shutter housing of the invention can have a 20% smaller diameter than a conventional shutter housing as illustrated in FIG. 2.

In FIG. 6 there is illustrated another embodiment of a structure according to the present invention. The blades 29 and 30 of FIG. 6 are supported by the common pivot pin 2, while the auxiliary blades 101 and 102 are in this embodiment supported for turning movement by a pair of additional pivot pins 103 and 104, respectively, which are symmetrically positioned with respect to the pivot 2. In this embodiment the motion-transmitting means which transmits turning of the leading shutter blade 30 to the leading auxiliary blade 102 takes the form of a pin-and-slot connection, and the same is true of the motion-transmitting means which transmits turning of the trailing shutter blade 29 to the trailing auxiliary blade 101. The trailing blades are shown in FIG. 6 in a position between their cocked and run-down positions. The pin 25 of the shutter blade 29 extends in the embodiment of FIG. 6 into a curved camming slot 101c formed in the auxiliary trailing blade 101, and the pin 26 extends into a slot 102c which is formed in the leading auxiliary blade 102. Thus, when the leading blade 30 is released from its cocked position so as to make the exposure, the pin 26 by cooperation with the slot 102c will control the manner in which the leading auxiliary blade 102 turns during the turning of the leading shutter blade 30, and in the same way when the blade 29 is released by the retarding structure the slot 101c will have its edges engaged by the pin 25 so as to control the manner in which the blade 101 turns in response to the turning of the blade 29. With this embodiment also there will be in the cocked position covering of the aperture 31 in part by the leading blade 30 and the remainder of the aperture 31 will be covered by the blade 102, with the extent of overlap between these blades in the cocked position being greater than the extent to which they overlap in the run-down position, and in the run-down position the aperture 31 will be partly covered by the trailing blade 29 and the remainder of the aperture 31 will be covered by the auxiliary blade 101 which in the run-down position overlaps the blade 29 to an extent less than the extent to which these blades overlap each other in the cocked position where both of the blades 29 and 101 are displaced completely beyond the aperture 31, the leading blades 30 and 102 being completely displaced beyond the aperture 31 in the run-down position of the parts, as indicated in FIG. 6.

In the embodiment of FIG. 7 the auxiliary blades 101 and 102 are also supported for turning movement by a pair of pins 103 and 104, and in this embodiment the blades 101 and 102 cross over each other and turn with respect to each other in the manner similar to a pair of scissors blades. A spring 105 is connected at its ends between the blades 101 and 102 so as to urge the blade 101 in a counterclockwise direction and blade 102 in a clockwise direction, as viewed in FIG. 7.

With the embodiment of FIG. 7, although the shutter blades 29 and 30 are still connected through the pins 25 and 26 with the driving levers 3 and 4, respectively, as described above in connection with FIG. 1, these pins 25 and 26 of FIG. 7 do not form part of a pair of motion-transmitting means, as was the case with the other embodiments. In the embodiment of FIG. 7 the motion-transmitting means is formed by a structure which includes edges of the blades which form camming edges and follower pins which are respectively carried by the auxiliary blades and which engage these camming edges of the shutter blades. Thus, it will be seen that the trailing auxiliary blade 101 fixedly carries a cam follower pin 101d which is maintained by the spring 105 in engagement with an edge portion of the trailing shutter blade 29 which forms a camming edge 29a, and the motion-transmitting means for the pair of leading blades 30 and 102 includes an edge portion of the blade 30 which forms the camming edge 30a and a follower pin 102d fixed to the leading auxiliary blade 102 and maintained by the spring 105 in engagement with the camming edge 30a.

The parts are shown in FIG. 7 in the cocked position where the leading shutter blade 30 partly covers the aperture 31, the auxiliary leading blade 102 overlapping the blade 30 and completing the covering of the aperture 31, while both of the trailing blades 29 and 101 are displaced completely beyond the aperture 31. Thus, when the shutter is tripped to make the exposure the blade 30 will turn to its run-down position while the blade 29 remains in its cocked position, and the camming edge 30a will cooperate with the pin 102d to displace the blade 102 beyond the aperture 31 while the blade 30 itself will move completely beyond the aperture 31 in a cockwise direction, as viewed in FIG. 7, so that the aperture 31 will become completely uncovered and an exposure will be made.

When the retarding structure releases the trailing shutter blade 29, this blade will turn in a clockwise direction to a position partly overlapping the blade 30 and partly covering the aperture 31, and by cooperation of the pin 101d with the camming edge 29a the spring 105 will turn the auxiliary trailing blade 101 in a counterclockwise direction, as viewed in FIG. 7, to its run-down position where the blade 101 overlaps the blade 29 and extends beyond the latter to complete the covering of the aperture 31.

During cocking of the shutter of FIG. 7, both of the blades 29 and 30 will turn as a unit, without any relative motion therebetween, about the common pivot 2, into the cocked position shown in FIG. 7, and it will be seen that this results in displacement of the trailing blades 29 and 101 completely beyond the aperture 31 while the leading blade 30 partly covers the aperture 31 and the auxiliary leading blade 102 overlaps the blade 30 and extends beyond the latter to complete the covering of the aperture 31.

It is to be noted that while with the embodiment of FIGS. 3–5 as well as with the embodiment of FIG. 6 the pair of blades which cooperate to cover the aperture either in the cocked or in the run-down position overlap each other during covering of the aperture to an extent less than that to which they overlap each other when both blades are situated beyond the aperture 31, in the embodiment of FIG. 7 when each pair of blades covers the aperture they overlap each other to an extent greater than the extent to which they overlap each other when they are displaced completely beyond the aperture. Thus it will be noted that in FIG. 7 in the cocked position illustrated therein where the blades 29 and 101 are displaced completely beyond the aperture 31 they overlap each other to an extent less than the extent to which the blades 30 and 102 overlap each other, these latter blades in this position serving to cover the aperture 31.

Moreover, it will be seen that in the three embodiments illustrated in FIGS. 3–7 the pair of shutter blades 29 and 30 are located next to each other and between the pair of auxiliary blades 101 and 102. However, this arrangement can be reversed and the pair of auxiliary blades can be located next to each other between the pair of shutter blades.

As is apparent from a comparison of either FIG. 6 or FIG. 7 with FIG. 2, these embodiments also achieve the same extent of reduction of the size of the shutter housing as the embodiment of FIGS. 3–5.

Of course, the invention is not limited to the particular details illustrated in FIGS. 3–7. Thus, the shutter blades 29 and 30 can be turnable about different axes, instead of having a common turning axis, and the auxiliary blades 101 and 102 can be turnable about a common turning axis while the blades 29 and 30 are turnable about a pair of independent axes, respectively, or all four blades can be respectively turnable about four different axes. Also, an arrangement where the pair of shutter blades 29 and 30 have a common turning axis, as shown in the drawings, but where the pair of auxiliary blades 101 and 102 also have a common turning axis different from the common turning axis of the blades 29 and 30 can also be of considerable advantage. Furthermore, it is possible to provide an arrangement where the driven blades 29 and 30 turn relative to each other during cocking of the shutter. It is of considerable advantage to have blades 29 and 30 of identical construction as well as blades 101 and 102 which are of an identical construction, as shown in the drawings, since in this way only two different stamping dies are required for punching the blades from a suitable sheet material.

A further reduction in the size of the shutter housing can be achieved by making all four, or at least three of the four blades of different configurations. Under certain circumstances a very substantial reduction in the size of the shutter housing can be provided where only a single auxiliary blade is provided in addition to the pair of shutter blades, and with all three blades of such a construction respectively having different configurations, the auxiliary blade turning in response to turning of one of the remaining shutter blades through the use of a motion-transmitting means having any of the above constructions. In certain cases it is also of considerable advantage if the turning axes for the blades are not symmetrically arranged with respect to each other and with respect to the exposure aperture.

Moreover, instead of using as part of the motion-transmitting structure the same pins 25 and 26 which serve to connect the driving levers and the shutter blades, it is possible to use additional pins to form part of the motion-transmitting structure, such as separate pins fixed to the shutter blades 29 and 30 and cooperating with edges of the auxiliary blades, respectively, and with shutter drives which are connected directly to the blades 29 and 30, the motion-transmiting structure can take the form of pins riveted to the blades 29 and 30 and cooperating with edges of the auxiliary blades, respectively.

In order to drive the blades 29 and 30 any known drive for a pair of shutter blades which turn together to the cocked position and one after the other to the run-down position can be used, and in particular those constructions where the driving springs are connected directly to the blades 29 and 30 can be used.

Furthermore, when the shutter is used for special purposes, such as the shutter of the twin-lens reflex camera, then the exposure aperture can be eccentrically arranged within the shutter housing, spaced from the center thereof, and in this way an even smaller shutter housing can be achieved, which is to say an even greater reduction in the size of the shutter housing can be achieved.

It will be understood that each of the elements described above, or two or more together, may also find a useful application in other types of cameras differing from the types described above.

While the invention has been illustrated and described as embodied in shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characterisics of the generic or specific aspects of this invention and, therefore, such adaptations should and are intended to be comprehended within the meaning and range of equivalence of the following claims.

What is claimed as new and desired to be secured by Letters Patent is:

1. In a between-the-lens shutter assembly having an exposure aperture, in combination, support means; leading and trailing shutter blades supported by said support means for turning movement between run-down and cocked positions, said blades turning together from their run-down to their cocked positions and said leading blade turning from its cocked to its run-down position in advance of said trailing blade to uncover said aperture and said trailing blade then turning from its cocked to its run-down position to partially cover said aperture, said leading blade in its run-down position being completely displaced beyond said aperture and in its cocked position partially covering said aperture, and said trailing blade in its run-down position partially covering said aperture and in its cocked position being completely displaced beyond said aperture; leading and trailing auxiliary blades also supported for turning movement by said support means; motion-transmitting means operatively connected to both of said leading blades for turning said leading auxiliary blade in response to turning of said leading shutter blade to a position where said leading auixiliary blade partially overlaps said leading shutter blade and completes the covering of said aperture when said leading shutter blade is in its cocked position partially covering said aperture and to a position where said leading auxiliary blade is completely displaced beyond said aperture when said leading shutter blade is in its run-down position completely displaced beyond said aperture; and second motion-transmitting means operatively connected to both of said trailing blades for turning said auxiliary trailing blade in response to turning of said trailing shutter blade to a position where said auxiliary trailing blade partially overlaps said trailing shutter blade and completes the covering of said aperture when said trailing shutter blade is in its run-down position and to a position where said trailing auxiliary blade is completely displaced beyond said aperture when said trailing shutter blade is in its cocked position displaced completely beyond said aperture.

2. In an assembly as recited in claim 1, both of said leading blades overlapping each other when they cooperate to cover said aperture to an extent less than when they are both completely displaced beyond said aperture, and both of said trailing blades overlapping each other when they cooperate to cover said aperture to an extent less than when both of said trailing blades are displaced completely beyond said aperture.

3. In an assembly as recited in claim 1, both of said leading blades overlapping each other when they cooperate to cover said aperture to an extent more than when they are both displaced beyond said aperture, and both of said trailing blades overlapping each other when they cooperate to cover said aperture to an extent more than when both of said trailing blades are completely displaced beyond said aperture.

4. In an assembly as recited in claim 1, said first-mentioned motion-transmitting means including a projection fixed to one of said leading blades and an edge portion of the other of said leading blades located in the path of movement of said projection, and said second motion-transmitting means comprising a projection fixed to one of said trailing blades and an edge portion of the other of said trailing blades located in the path of movement of said projection.

5. In an assembly as recited in claim 1, said first-mentioned motion-transmitting means comprising a pin-and-slot connection between said leading blades, and said second motion-transmitting means comprising a pin-and-slot connection between said trailing blades.

6. In an assembly as recited in claim 1, said first-mentioned motion-transmitting means including a camming edge forming part of the periphery of one of said leading blades and a follower pin fixed to the other of said leading blades and engaging said camming edge, and said second motion transmitting means including a camming edge forming part of the periphery of one of said trailing blades and a follower pin fixed to the other of said trailing blades and engaging said camming edge.

7. In an assembly as recited in claim 1, said leading and trailing shutter blades being supported for turning movement by said support means about a common turning axis and said leading and trailing auxiliary blades being supported by said support means for respective turning movement about a pair of additional axes.

8. In an assembly as recited in claim 1, said support means supporting all of said blades for turning movement about a common axis.

9. In an assembly as recited in claim 1, a single spring means operatively connected to both of said auxiliary blades for maintaining the latter in operative engagement with said shutter blades, respectively.

10. In an assembly as recited in claim 1, said support means supporting said shutter blades for turning movement about a common axis and said auxiliary blades for turning movement about a pair of additional axes, respectively, which are symmetrically arranged with respect to said common axis.

11. In an assembly as recited in claim 1, said auxiliary blades crossing over each other and having with respect to each other a scissors-type of action.

12. In an assembly as recited in claim 1, said auxiliary blades being located next to each other between said shutter blades.

13. In an assembly as recited in claim 1, said shutter blades being located next to each other between said auxiliary blades.

14. In an assembly as recited in claim 1, said shutter blades forming a first pair of blades and said auxiliary blades forming a second pair of blades, and said blades being arranged with one of said pairs located next to each other between the blades which constitute the other of said pairs of blades.

References Cited by the Examiner
UNITED STATES PATENTS
2,926,582   1/1960   Sonnberger _____ 95—60 X JOHN M. HORAN, *Primary Examiner.*